United States Patent
Lee et al.

(10) Patent No.: US 9,864,409 B2
(45) Date of Patent: Jan. 9, 2018

(54) FLEXIBLE DISPLAY DEVICE

(71) Applicant: Samsung Display Co., Ltd., Yongin, Gyeonggi-Do (KR)

(72) Inventors: Kangwon Lee, Seoul (KR); Jeongheon Lee, Seongnam-si (KR); Mansik Myeong, Seoul (KR); Sungku Kang, Suwon-si (KR); Hoonsik Kim, Seongnam-si (KR); Taehyeog Jung, Hwaseong-si (KR); Suk Choi, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 70 days.

(21) Appl. No.: 14/620,571

(22) Filed: Feb. 12, 2015

(65) Prior Publication Data
US 2015/0310776 A1 Oct. 29, 2015

(30) Foreign Application Priority Data

Apr. 28, 2014 (KR) .................. 10-2014-0050937

(51) Int. Cl.
G06F 1/16 (2006.01)
G06F 3/041 (2006.01)
H04M 1/02 (2006.01)

(52) U.S. Cl.
CPC ............ G06F 1/1652 (2013.01); G06F 3/041 (2013.01); H04M 1/0268 (2013.01)

(58) Field of Classification Search
CPC .................. G06F 1/1652; G06F 3/041; G06F 2203/04102; H04M 1/0268; G09G 2380/02

(Continued)

(56) References Cited

U.S. PATENT DOCUMENTS 4,018,954 A * 4/1977 Fukushima ............... B32B 5/24
428/213
2008/0277259 A1 11/2008 Chang
(Continued)

FOREIGN PATENT DOCUMENTS

| KR | 101048974 B1 | 7/2011 |
| KR | 1020120133848 A | 12/2012 |
| KR | 1020130086875 A | 8/2013 |

OTHER PUBLICATIONS

DuPont Vertak Reworkable Adhesives Product Selector, Du Pont The miracles of science, Copyright 2010 DuPont, 1 page.
(Continued)

*Primary Examiner* — Stephen Sherman
(74) *Attorney, Agent, or Firm* — Cantor Colburn LLP

(57) ABSTRACT

A flexible display device includes a flexible display panel, an outer member disposed on a surface of the flexible display panel and including an electrode layer, and a stress control member disposed between the flexible display panel and the outer member, where the stress control member allows neutral planes to be defined in the flexible display panel and the outer member, respectively, when the flexible display device is bent, the outer member includes a touch panel including the electrode layer, a flexible member disposed on the touch panel, and an adhesive layer disposed between the touch panel and the flexible member and which couples the touch panel to the flexible member, and a neutral plane of the outer member is defined in the touch panel.

13 Claims, 12 Drawing Sheets

(58) Field of Classification Search
USPC ......... 345/173–178; 178/18.01–18.09, 18.11
See application file for complete search history.

(56) References Cited

U.S. PATENT DOCUMENTS

2009/0163034 A1* 6/2009 Larson ................ B29C 65/5071
                                                          438/729
2009/0267916 A1   10/2009 Hotelling
2010/0295812 A1* 11/2010 Burns ................... G06F 3/0412
                                                          345/174
2012/0313877 A1* 12/2012 Han ........................ G06F 3/041
                                                          345/173

OTHER PUBLICATIONS

Beer, et al., Instructor's and Solutions Manual to accompany, Mechanics of Materials Fourth Edition, vol. I, Chapters 1-6, Published Oct. 13, 2015, pp. 1-1463.

* cited by examiner

FLEXIBLE DISPLAY DEVICE

This application claims priority to Korean Patent Application No. 10-2014-0050937, filed on Apr. 28, 2014, and all the benefits accruing therefrom under 35 U.S.C. §119, the content of which in its entirety is herein incorporated by reference.

BACKGROUND

1. Field

The disclosure relates to a flexible display device. More particularly, the disclosure relates to a flexible display device with reduced defects.

2. Description of the Related Art

Recently, bendable or foldable display devices (hereinafter, referred to as 'flexible display devices') have been developed. Such a flexible display device typically includes a flexible display panel and various outer members.

The outer members of a flexible display device may have different functions from each other. The outer members may be disposed on a surface of the flexible display panel and bent together with the flexible display panel when the flexible display device is bent.

SUMMARY

Exemplary embodiments of the invention provide a flexible display device, in which stress applied thereto is partially decoupled.

Exemplary embodiments of the invention also provide a flexible display device having a neutral plane defined to be adjacent to a device layer which may be vulnerable to stress.

According to an exemplary embodiment of the invention, a flexible display device includes: a flexible display panel; an outer member disposed on a surface of the flexible display panel and including an electrode layer; and a stress control member disposed between the flexible display panel and the outer member, where the stress control member allows neutral planes to be defined in the flexible display panel and the outer member, respectively, when the flexible display device is bent, the outer member includes: a touch panel including the electrode layer; a flexible member disposed on the touch panel; and an adhesive layer disposed between the touch panel and the flexible member and which couples the touch panel to the flexible member, and a neutral plane of the outer member is defined in the touch panel.

In an exemplary embodiment, a maximum shear strain of the stress control member may be about 150% or more.

In an exemplary embodiment, a maximum shear strain of the adhesive layer may be less than about 150%.

In an exemplary embodiment, a maximum distance from the neutral plane of the outer member to the electrode layer in a thickness direction of the outer member may be smaller than about a half of a thickness of the touch panel.

In an exemplary embodiment, the touch panel may further include a base layer on which the electrode layer is disposed, where the electrode layer may include: a first electrode layer disposed on the base layer and including a first conductive pattern extending substantially in a first direction; and a second electrode layer disposed on the base layer and including a second conductive pattern extending substantially in a second direction, and the second conductive pattern of the second electrode layer may cross and be insulated from the second conductive pattern of the second electrode layer.

In an exemplary embodiment, the touch panel may further include an insulating layer disposed between the first and second electrode layers.

In an exemplary embodiment, the neutral plane of the outer member may be defined between the first electrode layer and the second electrode layer.

In an exemplary embodiment, the neutral plane of the outer member may be defined in the electrode layer.

In an exemplary embodiment, a thickness of the touch panel may be substantially equal to a thickness of the flexible member, and a Young's modulus of the touch panel may be greater than a Young's modulus of the flexible member.

In an exemplary embodiment, the Young's modulus of the touch panel may be n times the Young's modulus of the flexible member, where n is a positive real number. In such an embodiment, the neutral plane of the outer member may be spaced apart from a central plane of the outer member by a distance in a range of about n/20 to about n/10 of a thickness of the touch panel. In such an embodiment, the electrode layer may be disposed between positions which are spaced apart from the central plane by about n/20 and about n/10 of the thickness of the touch panel, respectively.

In an exemplary embodiment, a thickness of the touch panel may be greater than a thickness of the flexible member, and a Young's modulus of the touch panel may be equal to or greater than a Young's modulus of the flexible member.

In exemplary embodiments, as described above, the neutral planes different from each other are defined in the flexible display panel and the outer member, respectively, when the flexible display device is bent. In such embodiments, a position of each of the neutral planes may be changed or controlled based on thicknesses and Young's moduli of component members of each of the flexible display panel and the outer member.

In an exemplary embodiment, the positions of the neutral planes may be controlled to be adjacent to elements constituting the flexible display device, and thus, damage of the elements may be substantially reduced or effectively prevented, as the elements (e.g., thin film transistors, organic light emitting diodes, or conductive layers) may not be damaged even though the flexible display device is bent.

BRIEF DESCRIPTION OF THE DRAWINGS

The above and other feature of the invention will become apparent by describing in further detail exemplary embodiments thereof with reference to the accompanying drawings, in which.

DETAILED DESCRIPTION OF THE EMBODIMENTS

Figure 1A:
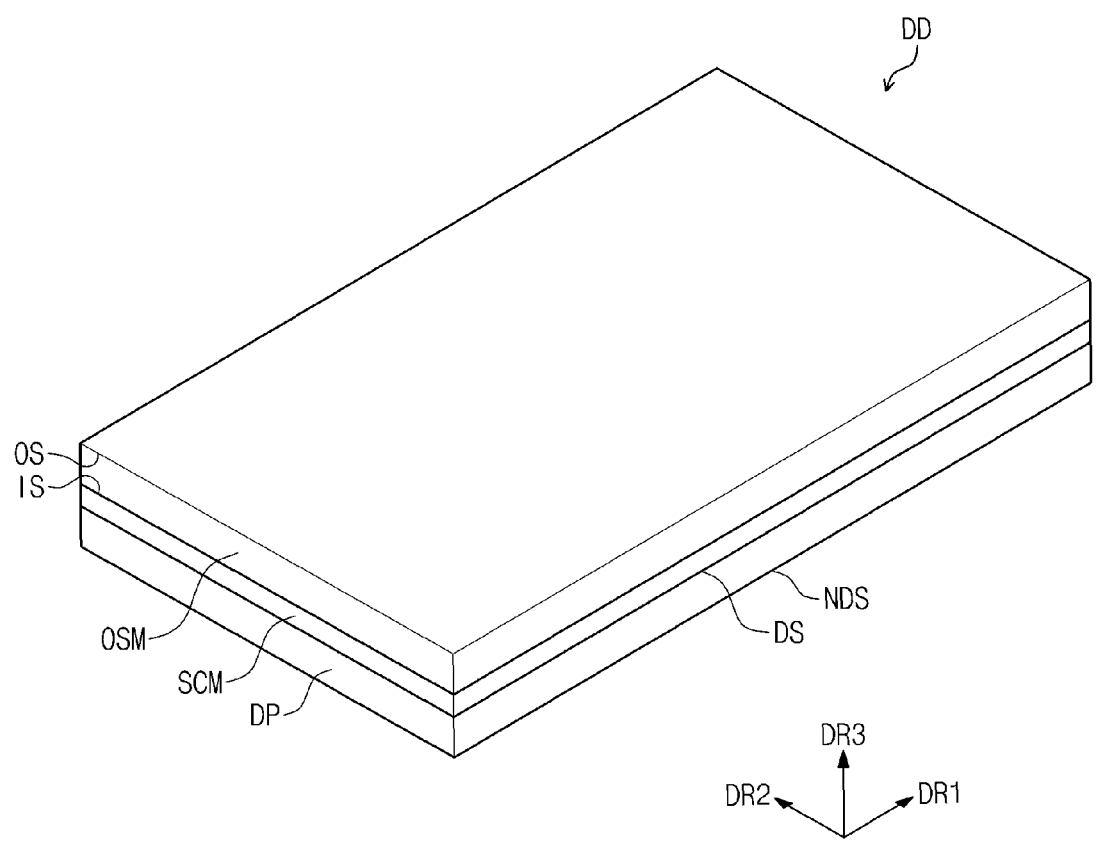
FIG. 1A is a perspective view showing an exemplary embodiment of a flexible display device that is unfolded according to the invention.

The inventions will now be described more fully hereinafter with reference to the accompanying drawings, in which various exemplary embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms, "a", "an" and "the" are intended to include the plural forms, including "at least one," unless the context clearly indicates otherwise. "Or" means "and/or." As used herein, the term "and/or" includes any and all combinations of one or more of the associated listed items. It will be further understood that the terms "comprises" and/or "comprising," or "includes" and/ or "including", when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 1B:
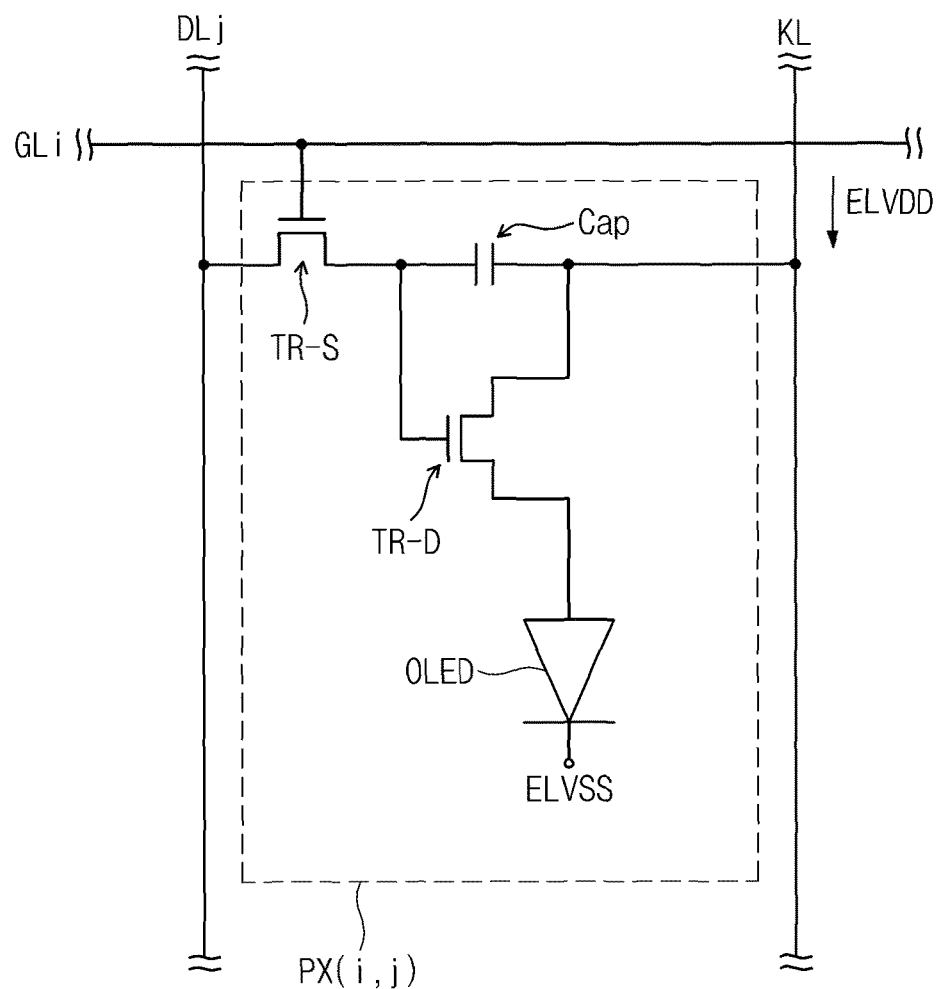
FIG. 1B is an equivalent circuit diagram of an exemplary embodiment of a pixel of a flexible display device, according to the invention.
Figure 1C:
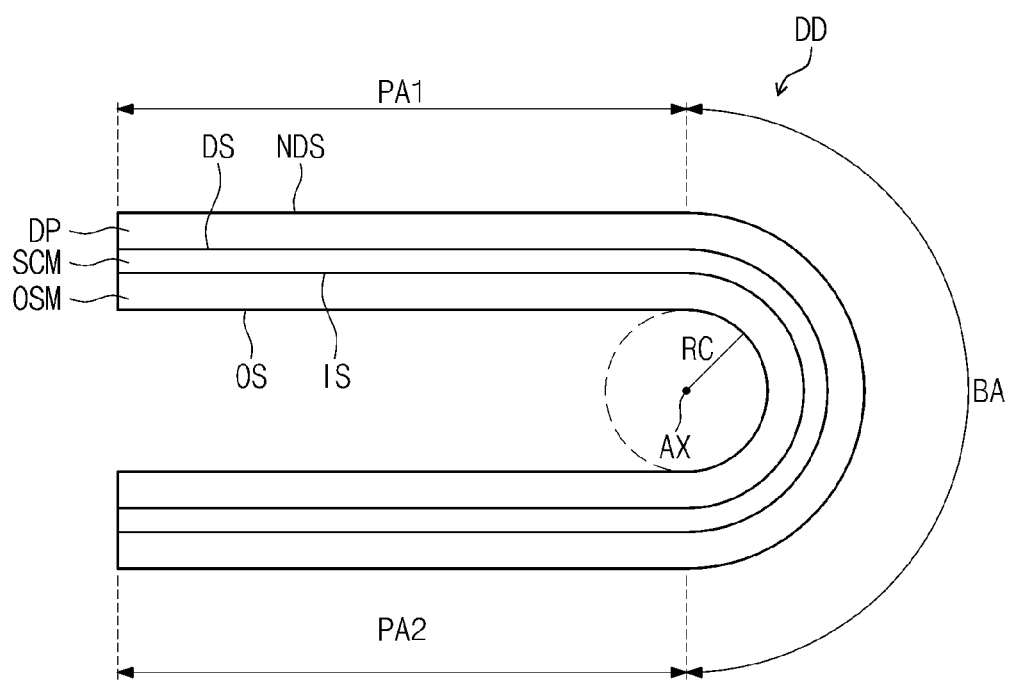
FIG. 1C is a side view showing an exemplary embodiment of a flexible display device having a bent shape, according to the invention.

FIG. 1A is a perspective view showing an embodiment of a flexible display device that is unfolded, according to the invention. FIG. 1B is an equivalent circuit diagram of an embodiment of a pixel of a flexible display device, according to the invention. FIG. 1C is a side view showing an embodiment of a flexible display device having a bent shape, according to the invention.

As illustrated in FIG. 1A, an exemplary embodiment of a flexible display device DD (hereinafter, referred to as 'a display device') includes a flexible display panel DP (hereinafter, referred to as 'a display panel'), a stress control member SCM, and a flexible outer member OSM (hereinafter, referred to as 'an outer member). The stress control member SCM and the outer member OSM are disposed on the display panel DP. The stress control member SCM is disposed between the display panel DP and the outer member OSM. Herein, a "member" may refer to a layer.

The display panel DP includes a display surface DS defined by a first direction DR1 and a second direction DR2 intersecting the first direction DR1. The display panel DP displays an image through the display surface DS. In one exemplary embodiment, for example, the display panel DP includes a single display surface DS, as shown in FIG. 1A. In an alternative exemplary embodiment, the display panel may include a plurality of display surfaces (e.g., front and rear surfaces) that display images.

In an exemplary embodiment, the display panel DP may be an organic light emitting display panel, an electrophoretic display panel, or an electro-wetting display panel. In one exemplary embodiment, for example, the display panel DP may be the organic light emitting display panel as shown in FIG. 1B. In an exemplary embodiment, the display panel DP includes a flexible base substrate (not shown), signal interconnections (not shown) disposed on the base substrate, insulating layers (not shown) disposed on the base substrate, and pixels (not shown) electrically connected to the signal interconnections. Each of the pixels includes a display element and a circuit part for controlling the display element.

FIG. 1B shows an equivalent circuit of an exemplary embodiment of a pixel PX(i,j) of the display device. FIG. 1B shows components of a pixel PX(i,j) of an exemplary embodiment of the display device, but not being limited thereto. In an alternative exemplary embodiment, the components of the pixel PX(i,j) may be variously modified. In an exemplary embodiment, the pixel PX(i,j) receives a gate signal from an i-th gate line GLi and a data signal from a j-th data line DLj. The pixel PX(i,j) receives a first power voltage ELVDD from a power source line KL.

In an exemplary embodiment, the pixel PX(i,j) includes an organic light emitting diode OLED as the display element. The pixel PX(i,j) may further include a switching thin film transistor TR-S, a driving thin film transistor TR-D and a capacitor Cap, which define the circuit part.

The switching thin film transistor TR-S outputs the data signal applied to the j-th data line DLj in response to the gate signal applied to the i-th gate line GLi. The capacitor Cap charges a voltage corresponding to the data signal received from the switching thin film transistor TR-S.

The driving thin film transistor TR-D is connected to the organic light emitting diode OLED, which is connected to a second power voltage ELVSS. The driving thin film transistor TR-D controls a driving current flowing through the organic light emitting diode OLED in response to the amount of charges stored in the capacitor Cap. The organic light emitting diode OLED emits light during a turn-on period of the driving thin film transistor TR-D.

The capacitor Cap may be disposed between the plurality of insulating layers included in the pixel PX(i,j). Two electrodes of the capacitor Cap may be disposed on two different layers of the plurality of insulating layers, respectively. The two electrodes may constitute a portion of the organic light emitting diode OLED.

Referring back to FIG. 1A, in an exemplary embodiment, the stress control member SCM is disposed on the display surface DS. In an alternative exemplary embodiment, the stress control member SCM may be disposed on a non-display surface NDS opposite to the display surface DS.

The stress control member SCM may allow other members or layer to be coupled to each other by being in contact with the stress control member SCM. In an exemplary embodiment, the stress control member SCM couples the display panel DP to the outer member OSM.

The stress control member SCM may be a pressure sensitive adhesive (may also be referred to as "PSA"). In an exemplary embodiment, the pressure sensitive adhesive includes a polymer, a cross-linking agent, or a resin, for example. In such an embodiment, the polymer may include acrylic polymers, silicon-based polymers, urethane-based polymers or a combination thereof.

The pressure sensitive adhesive may have one of various shapes. In one exemplary embodiment, for example, the pressure sensitive adhesive may have a sheet shape. The pressure sensitive adhesive having the sheet shape (hereinafter, "pressure sensitive adhesive sheet") includes a portion having a relatively high viscosity and a portion having a relatively high elasticity in a thickness direction thereof. An outer surface portion of the pressure sensitive adhesive sheet may correspond to the portion having the high viscosity, and an inner portion (or an inner layer) of the pressure sensitive adhesive sheet may correspond to the portion having the high elasticity. In an exemplary embodiment, the stress control member SCM is not limited to the pressure sensitive adhesive. In an alternative exemplary embodiment, the stress control member AM may include another adhesive member including an elastic inner layer and a viscous outer layer.

The outer member OSM is disposed on the stress control member SCM. The outer member OSM may include a touch panel, an optical member, a window member, or a protecting member, for example. In such an embodiment, the outer member OSM may include more than one of the touch panel, the optical member, the window member and the protecting member. In such an embodiment, members or layers of the outer member OSM may be stacked one on another in a third direction DR3 or a thickness direction of the display device, which is perpendicular to the first and second directions DR1 and DR2 or the display surface DS.

The outer member OSM includes an inner surface IS facing the stress control member SCM and an outer surface OS opposite to the inner surface IS. In other embodiments, the outer member OSM may be disposed on the non-display surface NDS.

In an exemplary embodiment, as illustrated in FIG. 1C, the display device DD may be bent at a predetermined region. In an exemplary embodiment shown in FIG. 1C, the display device DD is bent or folded in such a way that portions of the outer surface OS face each other. In such an embodiment, where the display device DD is bent, the display device DD may be divided into a bent region BA, a first planar region PA1 and a second planar region PA2.

Degrees of shape transformation of the first and second planar regions PA1 and PA2 are less than a degree of shape transformation of the bent region BA. In an exemplary embodiment, the first and second planar regions PA1 and PA2 may not provide flat surfaces. In an alternative exemplary embodiment, an entire portion of the display device DD may be curved or the display device DD may be rolled.

In such an embodiment, the first planar region PA1 or the second planar region PA2 may include a curved surface.

When the display device DD is bent, the display device DD has a predetermined radius of curvature RC and a predetermined bending angle. In an exemplary embodiment, as shown in FIG. 1C, the radius of curvature RC may be defined as the shortest distance from a bending axis AX to the display device DD. In an alternative exemplary embodiment, the radius of curvature RC may be defined as the shortest distance from the bending axis AX to the non-display surface NDS of the bent region BA. In such an embodiment, as the radius of curvature RC increases, an occupying ratio of the bent region BA to an entire region (e.g., a total area of the bent region BA, the first planar region PA1 and the second planar region PA2) may increase in the display device DD.

The bending angle may be defined as an angle by which an unfolded display device DD is bent on the bending axis AX, thereby forming an angle between the first and second planar regions PA1 and PA2. In one exemplary embodiment, for example, as shown in FIG. 1C, the bending angle of the display device DD may be defined as about 180 degrees when the first and second planar regions PA1 and PA2 are disposed substantially parallel to each other.

In such an embodiment, the display device DD may be bent in various shapes, that is, the bending angle may be variously controlled. In an exemplary embodiment, the display device DD may be bent by the bending angle of about 120 degrees, such that the angle between the first and second planar regions PA1 and PA2 may become about 60 degrees. In such an embodiment, the display device DD may be bent by the bending angle of about 90 degrees, such that the angle between the first and second planar regions PA1 and PA2 may become about 90 degrees. In an exemplary embodiment, as shown in FIG. 1C, the display device DD may be bent to allow the outer member OSM to be disposed inside the bent display device DD, but not being limited thereto. In such an embodiment, the display device DD may be bent to allow the display panel DP to be disposed inside the bent display device DD.

Figure 2:
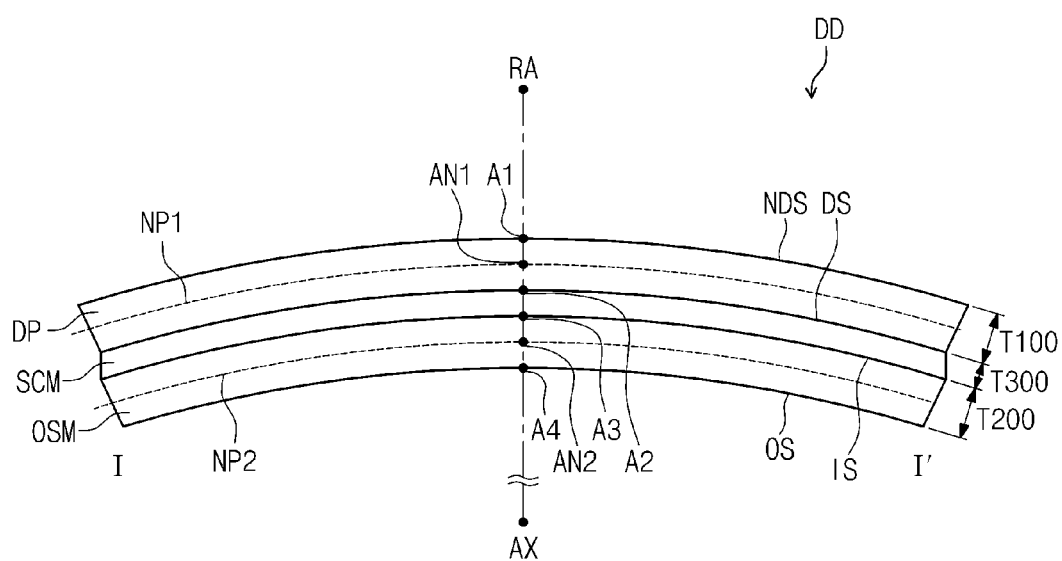
FIG. 2 is a cross-sectional view showing an exemplary embodiment of a flexible display device having a bent shape, according to the invention.
Figure 3A:
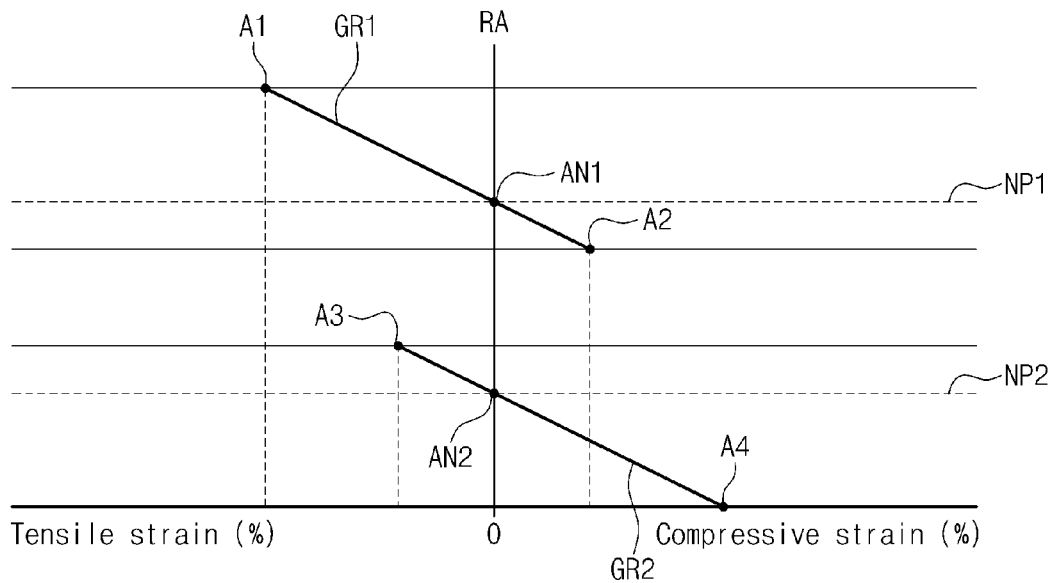
FIG. 3A is a graph showing a strain occurring in the display device shown in FIG. 2.
Figure 3B:
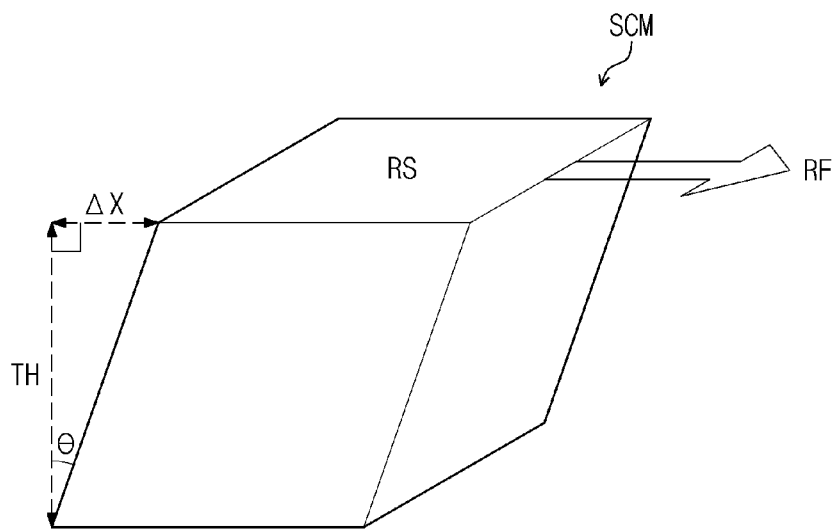
FIG. 3B is a perspective view showing an exemplary embodiment of a method of measuring a strain occurring in a display device.

FIG. 2 is a cross-sectional view showing an exemplary embodiment of a flexible display device having a bent shape according to the invention. FIG. 3A is a graph showing a strain occurring in the display device shown in FIG. 2. FIG. 3B is a perspective view showing an exemplary embodiment of a method of measuring a strain occurring in a display device.

In an exemplary embodiment, as illustrated in FIG. 2, the display panel DP, the outer member OSM and the stress control member SCM have predetermined thicknesses T100, T200 and T300, respectively.

When the display device DD is bent, stress is applied to the display device DD. The stress may be defined as a force applied to a unit area of the display device DD from the outside. Portions of the display device DD, to which the stress is applied, may be transformed.

Stresses having different magnitudes and different directions may be applied to portions of the display device DD. In one exemplary embodiment, for example, when the display device DD is bent, a compressive stress may be applied to an inner portion of the display device DD adjacent to the bending axis AX, and a tensile stress may be applied to an outer portion of the display device DD far away from the bending axis AX.

A neutral plane is defined in the display device DD. The neutral plane is defined as a plane on which a magnitude of the compressive stress is equal to a magnitude of the tensile stress. The neutral plane may be defined as a plane defined by points being at equal distances from the bending axis AX.

The compressive stress and the tensile stress on the neutral plane have substantially the same magnitude as each other and are applied in directions opposite to each other. Thus, a strain caused by the tensile stress and a strain caused by the compressive stress are substantially zero in a portion of the display device DD in the neutral plane.

In an exemplary embodiment, as shown in FIG. 2, a plurality of neutral planes NP1 and NP2 different from each other may be partially defined in the display device DD when the display device DD is bent. The stress control member SCM physically couples the display panel DP to the outer member OSM. In an exemplary embodiment, the stress control member SCM partially decouples the stress of the display panel DP from the stress of the outer member OSM.

In such an embodiment, the stresses are applied to the display panel DP and the outer member OSM substantially independently of each other by the stress control member SCM. When the display panel DD is bent, the neural planes NP1 and NP2 different from each other occurs in the display panel DP and the outer member OSM, respectively.

Graphs GR1 and GR2 shown in FIG. 3A show strains occurring in the display device DD. The graphs GR1 and GR2 include strains occurring in six spots A1, A2, A3, A4, AN1 and AN2. The six spots A1, A2, A3, A4, AN1 and AN2 are disposed on a reference line RA that extends from the bending axis AX and is perpendicular to the display surface DS.

The strain is varied depending on a magnitude and a direction of a stress applied to a portion at which the strain is measured. Since the stress of the display panel DP is partially decoupled from the stress of the outer member OSM, the strain of the display surface DS occurs by one of the compressive stress and the tensile stress, and the strain of the inner surface IS of the outer member OSM occurs the other of the compressive stress and the tensile stress.

In such an embodiment of the display device DD, the maximum compressive stress is applied to the display surface DS being in contact with the stress control member SCM and the maximum tensile stress is applied to the non-display surface NDS with respect to the neutral plane NP1 of the display panel DP. In the outer member OSM, the maximum tensile stress is applied to the inner surface IS being in contact with the stress control member SCM and the maximum compressive stress is applied to the outer surface OS closer to the bending axis AX with respect to the neutral plane NP2 of the outer member OSM.

Thus, a compressive strain occurs at a second spot A2 corresponding to one spot of the display surface DS, and a tensile strain occurs at a third spot A3 corresponding to one spot of the inner surface IS of the outer member OSM.

The strain of the display surface DS of the display panel DP occurs by one of the compressive stress and the tensile stress, and the strain of the non-display surface NDS of the display panel DP occurs by the other of the compressive stress and the tensile stress. When the compressive strain occurs at the second spot A2, the tensile strain occurs at a first spot A1 corresponding to one spot of the non-display surface NDS.

The strain of the inner surface IS of the outer member OSM occurs by one of the compressive stress and the tensile stress, and the strain of the outer surface OS of the outer member OSM occurs by the other of the compressive stress and the tensile stress. When the tensile strain occurs at the third spot A3 corresponding to one spot of the inner surface IS, the compressive strain occurs at a fourth spot A4 corresponding to one spot of the outer surface OS.

A fifth spot AN1 corresponds to a spot of the neutral plane NP1 defined in the display panel DP. Accordingly, magnitudes of the compressive and tensile stresses applied to the fifth spot AN1 are equal to each other. A sixth spot AN2 corresponds to a spot of the neutral plane NP2 defined in the outer member OSM. Accordingly, magnitudes of the compressive and tensile stresses applied to the sixth spot AN2 are equal to each other. Thus, a substantial strain may not occur at the fifth and sixth spots AN1 and AN2, as shown in FIG. 3A.

When the display device DD is bent as shown in FIG. 2, the outer member OSM is disposed inside the bent display device DD and the display panel DP is disposed outside the bent display device DD, such that the compressive strain of the fourth spot A4 is greater than the compressive strain of the second spot A2. Accordingly, the tensile strain of the first spot A1 is greater than the tensile strain of the third spot A3. When the display device DD is bent in a direction opposite to the bending direction of the display device DD shown in FIG. 2, a compressive strain occurring in the display panel DD may be greater than a compressive strain occurring in the outer member OSM.

As shown in FIG. 3B, a shear stress is applied to the stress control member SCM when the display device DD is bent. The shear stress KS is represented by the following equation 1.

$$KS = \frac{RS}{RF} \qquad \text{Equation 1}$$

In the equation 1, "RS" denotes an area of a corresponding member (i.e., the stress control member SCM), and "RF" denotes a force applied to the corresponding member when the display device DD is bent. Accordingly, the shear stress KS may be determined by a ratio of the area RS to the force RF. The stress control member SCM receiving the shear stress KS may be deformed to correspond to a shear modulus. A deformation rate of the stress control member SCM may be represented by a shear strain SS.

The shear strain SS is represented by the following equation 2.

$$SS = \frac{\Delta X}{TH} \qquad \text{Equation 2}$$

In the equation 2, "TH" denotes a thickness of the corresponding member, and "ΔX" denotes a displacement occurring in the corresponding member. Accordingly, the shear strain SS may be determined by a ratio of the thickness TH to the displacement ΔX. Here, the displacement ΔX is a displacement occurring in a direction parallel to a direction of the force RF applied to the corresponding member. As a result, the shear strain SS is equal to a tan θ, where θ is an angle shown in FIG. 3B.

When the display device DD is bent, the display panel DP and the outer member OSM may be plastically deformed by the applied stress. The plastic deformation of the display panel DP and the outer member OSM may correspond to an error or a defect of the display device DD. The strain plastically deforming the display panel DP and the outer member OSM is defined as a critical strain.

In an exemplary embodiment, when the display device DD is bent, a portion, in which the maximum shear strain occurs, of the bent portion of the stress control member SCM may have a shear strain of about 150% or more to effectively prevent the critical shear strain from occurring in the display panel DP and the outer member OSM. In such an embodiment, the radius of curvature of the display device DD may be about 20 millimeters (mm) or less. The radius of curvature and the bending angle of the display device DD may be variously modified.

When the stress control member SCM receiving the shear stress is deformed to correspond to the shear stress, the compressive stress and the tensile stress of the display panel DP may be partially decoupled from those of the outer member OSM as described above with reference to FIGS. 2 and 3A. In an exemplary embodiment, where the maximum shear stress of the stress control member SCM is about 150% or more, the stress control member SCM may be sufficiently deformed to partially decouple the stresses of the display panel DP from the stresses of the outer member OSM. In such an embodiment, the display panel DP and the outer member OSM may have the neutral planes NP1 and NP2, respectively, by the stress control member SCM, and may be controlled independently of each other in stress view.

Figure 4:
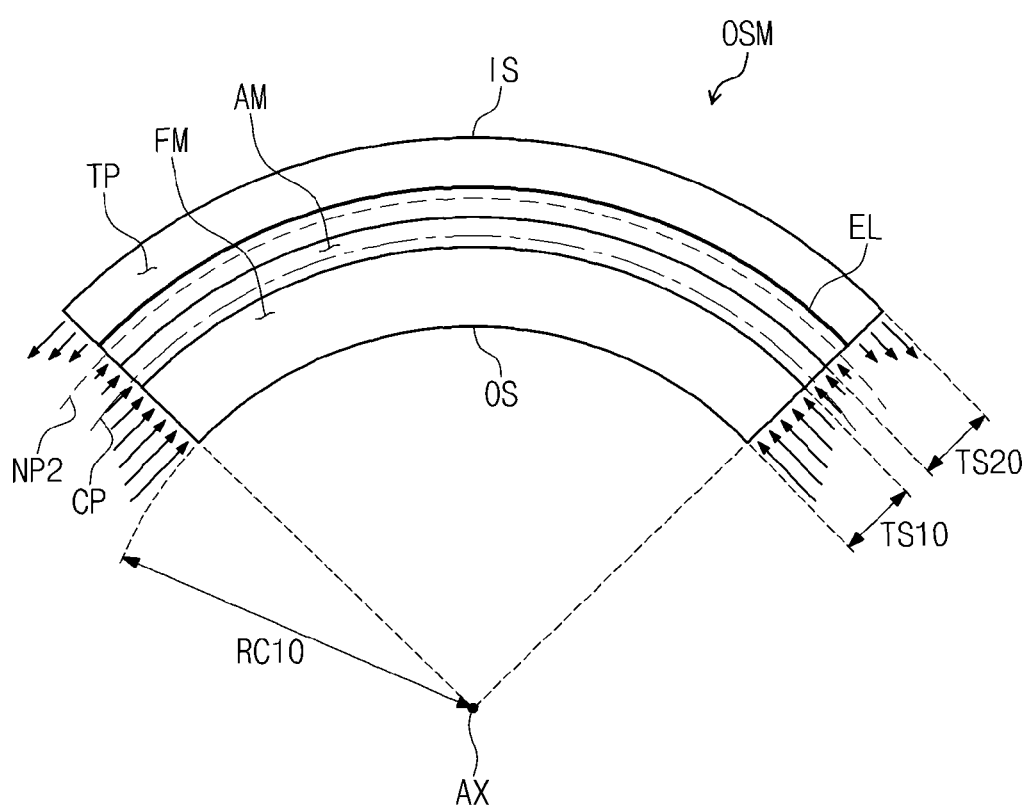
FIG. 4 is a cross-sectional view showing an exemplary embodiment of an outer member having a bent shape, according to the invention.
Figure 5A:
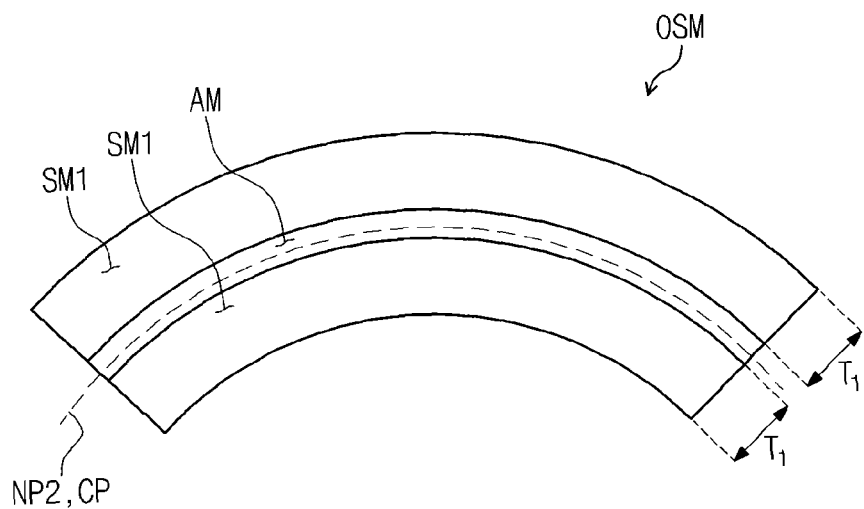
FIGS. 5A to 5C are cross-sectional views showing a position of a neutral plane in an outer member according to Young's Modulus.
Figure 5B:
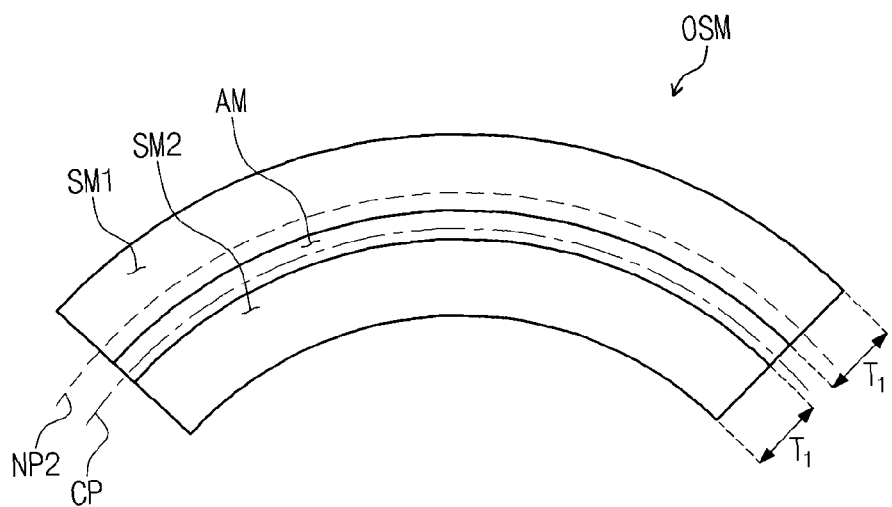
Figure 5C:
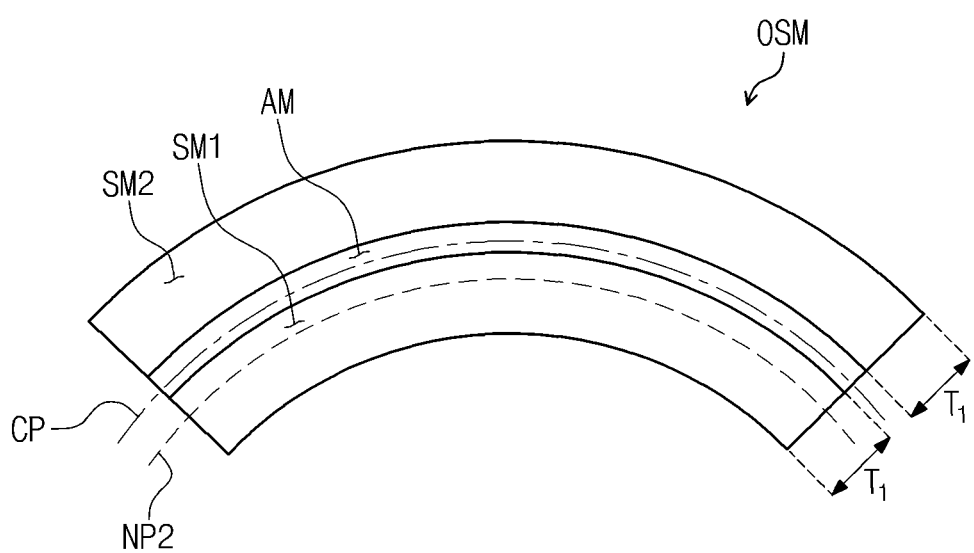

FIG. 4 is a cross-sectional view showing an exemplary embodiment of an outer member having a bent shape according to the invention. FIGS. 5A to 5C are cross-sectional views showing a position of a neutral plane an outer member. Hereinafter, shift of the neutral plane NP2 of the outer member OSM according to bending will be described with reference to FIGS. 4 and 5A to 5C.

As shown in FIG. 4, the outer member OSM may include a plurality of components (e.g., members or layers) which are sequentially stacked one on another. In an exemplary embodiment, the plurality of components may include a touch panel TP, a flexible member FM and an adhesive layer AM, for example. The touch panel TP and the flexible member FM have predetermined thicknesses TS10 and TS20, respectively.

The outer member OSM may be bent with a predetermined radius of curvature RC10. The flexible member FM and the adhesive layer AM are disposed between the touch panel TP and the bending axis AX. One surface of the touch panel TP defines an inner surface IS of the outer member OSM. The touch panel TP may include an electrode layer EL.

In an exemplary embodiment, the touch panel TP senses an external input signal occurring on the display device. When an object, e.g., a finger of a user or an electronic pen, indicates (e.g., touches or disposed substantially close to) a specific spot of the display device, the electrode layer EL obtains coordinate data of the specific spot. The touch panel TP may sense the external input signal by one of various methods such as a capacitive method, a resistive method and an electromagnetic induction method, for example.

In an exemplary embodiment, the electrode layer EL is disposed within the touch panel TP. However, exemplary embodiments of the invention are not limited thereto. In an alternative exemplary embodiment, the electrode layer EL may be disposed on the inner surface IS of the outer member OSM or on a surface of the touch panel TP adjacent to the adhesive layer AM.

The electrode layer EL may include indium tin oxide ("ITO"), tin oxide ("TO"), indium zinc oxide ("IZO"), indium tin zinc oxide ("ITZO"), a metallic single-walled carbon nanotube ("SWCNT"), a conductive polymer (e.g., poly 3,4-ethylenedioxythiophene ("PEDOT")), or a combination thereof.

The flexible member FM is disposed on a surface of the touch panel TP. As described above, the flexible member FM may be disposed between the touch panel and the bending axis AX when the outer member OSM is bent as shown in FIG. 4. A surface of the flexible member FM defines an outer surface OS of the outer member OSM.

The flexible member FM may have at least one of various functions. In one exemplary embodiment, for example, the flexible member FM may be a polarization member. The polarization member may include an absorption axis extending in a predetermined direction. The polarization member may absorb a component of incident light, which oscillates along a direction substantially parallel to the extending direction of the absorption axis.

In an alternative exemplary embodiment, the flexible member FM may be a window member. The window member protects the touch panel TP. The window member may have one of various shapes. In one exemplary embodiment, for example, the window member may be a protection coating layer or a protection film.

The adhesive layer AM is disposed between the touch panel TP and the flexible member FM. The adhesive layer AM may include a hard adhesive having negligible viscosity and elasticity. The adhesive layer AM physically couples the touch panel TP and the flexible member FM to each other.

The adhesive layer AM may be a pressure sensitive adhesive. The pressure sensitive adhesive may include a polymer, a cross-linking agent, and a resin, for example. The adhesive layer AM has a Young's modulus higher than that of the stress control member SCM.

The adhesive layer AM has a shear strain lower than that of the stress control member SCM. In one exemplary embodiment, for example, the shear strain of the adhesive layer AM may be less than about 150%. Thus, when the outer member OSM is bent, the adhesive layer AM may also couple the stresses of the touch panel TP to the stresses of the flexible member FM. As a result, a neutral plane NP2 is formed in the outer member OSM.

A thickness and a Young's modulus of the adhesive layer AM are substantially smaller than those of the flexible member FM, such that the adhesive layer AM may have a relatively small effect on the shift of the neutral plane NP2. Thus, the outer member OSM may be modeled as a double layer of the touch panel TP and the flexible member FM without consideration of the thickness of the adhesive layer AM for the purpose of ease and convenience of understanding.

A position of the neutral plane disposed in the double layer defined as a single layer may be modeled as the following equation 3.

$$\int \sigma_{x1} dA + \int \sigma_{x2} dA = E_1 \int y dA + E_2 \int y dA = 0 \quad \text{Equation 3}$$

The position of the neutral plane defined in the double layer including a plurality of members coupled to each other in stress view may be obtained using stresses $\sigma_{x1}$ and $\sigma_{x2}$ respectively applied to the plurality of members. The neutral plane is defined at a position at which a net stress is substantially zero (0). Thus, a position at which a net force is zero (0) in the plurality of members may be calculated as the position of the neutral plane.

The force of each of the members may be defined as a value obtained by integrating the stress applied to each of the members with respect to an area. In addition, the stress of a position in each of the members may be defined as a value obtained by integrating a value obtained by multiplying the Young's module $E_1$ or $E_2$ thereof by a strain according to the position Thus, the position, which is obtained from the equation 3, of the neutral plane NP2 of the outer member OSM may be applied to the outer member OSM shown in FIG. 4. The equation 3 may be converted into the following equation 4 represented using the thicknesses and the Young's moduli of the members constituting the outer member OSM.

$$(E_{TP}TS10 + E_{FM}TS20)h_N = \quad \text{Equation 4}$$
$$\left(\frac{TS20}{2} + TS10\right)E_{TP}TS20 + \frac{TS10}{2}E_{FM}TS10$$

The neutral plane NP2 of the outer member OSM is defined at a position that is spaced part from the outer surface OS of the outer member OSM by a predetermined distance $h_N$ in a thickness direction of the outer member OSM. As shown in the equation 4, the predetermined distance $h_N$ may be determined based on the thickness TS10 and the Young's modulus $E_{FM}$ of the flexible member FM, and the thickness TS20 and the Young's modulus $E_{TP}$ of the touch panel TP.

In an exemplary embodiment, as described above, the neutral plane NP2 may be defined in the touch panel TP by the thickness TS10 and the Young's modulus $E_{FM}$ of the flexible member FM, and the thickness TS20 and the Young's modulus $E_{TP}$ of the touch panel TP. The outer member OSM includes a central plane CP. A distance between the central plane CP and the outer surface OS is about a half of a thickness of the outer member OSM. The neutral plane NP2 of the outer member OSM is defined at a position different from a position of the central plane CP. In such an embodiment, when the thickness TS10 of the flexible member FM is substantially equal to the thickness TS20 of the touch panel TP, the central plane CP of the outer member OSM is disposed in the adhesive layer AM.

In an exemplary embodiment, the neutral plane NP2 may be defined between the central plane CP and the inner surface IS when the touch panel TP defines the inner surface IS. In such an embodiment, the neutral plane NP2 of the outer member OSM may be defined to be adjacent to the electrode layer EL.

In such an embodiment, when a distance between the electrode layer EL and the neutral plane NP2 is smaller than about a half of the thickness TS20 of the touch panel TP, damage of the electrode layer EL may be substantially reduced when the display device is bent. The distance may be in a range not damaging the electrode layer EL even though the touch panel TP is folded. As the electrode layer EL becomes closer to the neutral plane NP2, the compressive or tensile stress applied or affected to the electrode layer EL is reduced.

The neutral plane NP2 of the outer member OSM may be shifted upward or downward along the thickness direction of the outer member OSM. Referring to Equations 3 and 4 described above, the Young's modulus of each of the members constituting the outer member OSM may be variously determined to control the position of the neutral plane NP2 of the outer member OSM. This will be described in greater detail with reference to FIGS. 5A to 5C.

FIG. 5A shows an outer member OSM of a comparison example. The outer member OSM of the comparison example includes first members SM1 that are stacked one on another with the adhesive layer AM disposed therebetween.

The first members SM1 may have a same Young's modulus, e.g., Young's moduli of a first value. As shown in the equations 3 and 4, a neutral plane NP2 may be defined at a central plane CP of the outer member OSM of the comparison example.

In an outer member OSM including the flexible member FM and the touch panel TP, if the Young's modulus of the flexible member FM is equal to the Young's modulus of the touch panel TP, the neutral plane NP2 of the outer member OSM may be defined at the central plane CP. That is, the neutral plane NP2 of the outer member OSM may be defined at a position which is spaced apart from the inner surface IS by about a half of the thickness of the outer member OSM.

However, in such an outer member OSM, the neutral plane NP2 may be shifted in a predetermined error range. The error range may be defined as ±0.05 (or ±5%) according to an experimental result.

FIG. 5B shows an embodiment of the outer member OSM including members having Young's moduli different from each other. In the embodiment of an outer member OSM shown in FIG. 5B, which is bent, a first member SM1 having the Young's modulus of the first value is disposed to be far away from the bending axis, and a second member SM2 having the Young's modulus of a second value smaller than the first value is disposed between the first member SM1 and the bending axis. In the embodiment of an outer member OSM shown in FIG. 5B, a thickness $T_1$ of the first member SM1 is substantially equal to a thickness $T_1$ of the second member SM2.

In the embodiment of the outer member OSM shown in FIG. 5B, the neutral plane NP2 may be defined in the first member SM1 based on the equations 3 and 4. The neutral plane NP2 is defined between the central plane CP and the inner surface of the outer member OSM.

The neutral plane NP2 of FIG. 5B is shifted from the central plane CP into the first member SM1 having the relatively greater Young's modulus, as compared with the comparison example of FIG. 5A. The neutral plane NP2 of FIG. 5B may have the error range described with reference to FIG. 5A.

In an exemplary embodiment shown in FIG. 4, the neutral plane NP2 may be shifted from the central plane CP toward the touch panel TP. In such an embodiment, if the touch panel TP and the flexible member FM have the same thickness and the Young's modulus of the touch panel TP is greater than the Young's modulus of the flexible modulus, the neutral member NP2 of the outer member OSM is defined in the touch panel TP.

In one exemplary embodiment, for example, where the touch panel TP and the flexible member FM have the same thickness and the Young's modulus of the touch panel TP is n times the Young's modulus of the flexible modulus, the neutral plane NP2 may be shifted from the central plane CP into the touch panel TP by a distance in a range of about n/20 to about n/10 of the thickness of the touch panel TP.

In one exemplary embodiment, for example, the display device having the touch panel TP and the flexible member FM is folded with the radius of curvature of about 5 mm. In an exemplary embodiment, where the thickness of each of the touch panel TP and the flexible member FM is about 50 micrometers (μm) and the Young's modulus of the touch panel TP is n times the Young's modulus of the flexible modulus, the position of the neutral plane NP2 may be represented by the following Table 1.

TABLE 1

| Young's modulus ratio (n times) of touch panel to flexible member | Shifted distance of Neutral plane (μm) |
|---|---|
| 2 | 8.3 |
| 2.5 | 10.7 |
| 3 | 12.5 |

The shifted distance of the neutral plane NP2 may be defined as a distance of the neutral plane that is shifted from a surface of the touch panel TP toward a central plane of the touch panel TP. As shown in the table 1, if the thicknesses of the touch panel TP and the flexible member FM are substantially equal to each other, the shifted distance of the neutral plane NP2 increases as the Young's modulus ratio of the touch panel to the flexible member increases.

In an exemplary embodiment of the display device according to the invention, the Young's modulus ratio may be set or controlled to allow the position of the neutral plane NP2 to be adjacent to the electrode layer EL. Thus, even though the electrode layer EL is disposed within the touch panel TP, the neutral plane NP2 may be shifted to the central plane of the touch plane TP to effectively prevent the electrode layer EL from being damaged by bending of the display device.

In an embodiment of the outer member OSM shown in FIG. 5C, a member having a relatively great Young's modulus is disposed between the bending axis and a member having a relatively small Young's modulus. In the embodiment of FIG. 5C, the first member SM1 is disposed between the bending axis and the second member SM2 having the Young's modulus smaller than the Young's modulus of the first member SM1.

In the embodiment shown in FIG. 5C, referring to the equations 3 and 4, the neutral plane NP2 may be defined in the first member SM1 having the relatively great Young's modulus. Since the neutral plane NP2 may be shifted into the inside or the outside of the central plane CP as described with reference to FIGS. 5A to 5C, the position of the electrode layer EL may be determined to be adjacent to the neutral plane NP2.

Figure 6A:
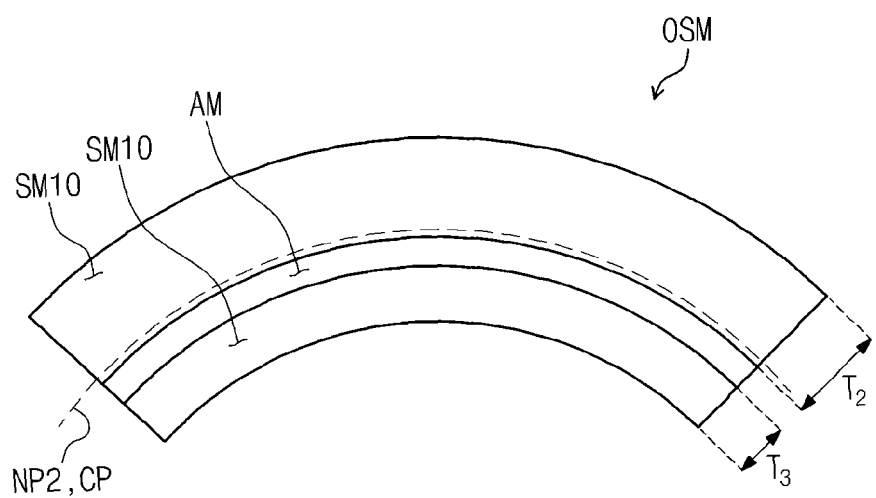
FIGS. 6A to 6C are cross-sectional views showing a position of a neutral plane of an outer member according to a thickness.
Figure 6B:
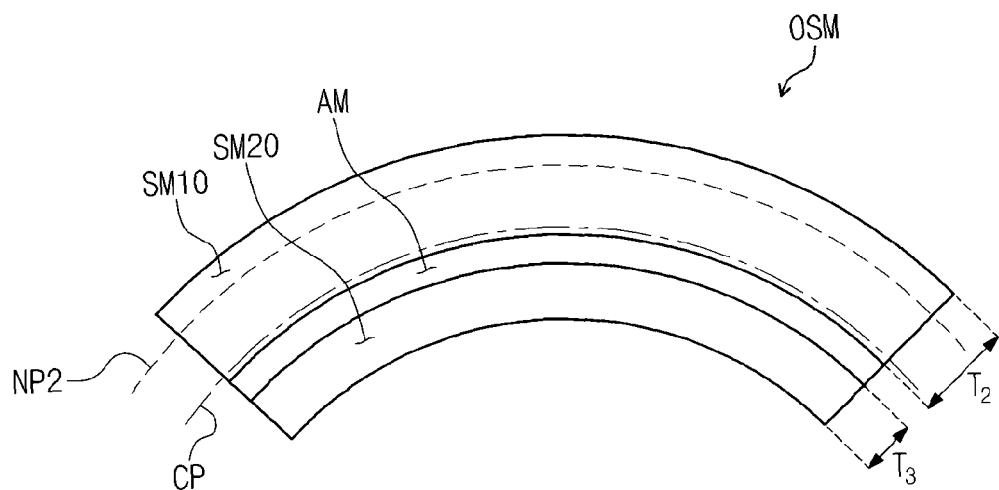
Figure 6C:
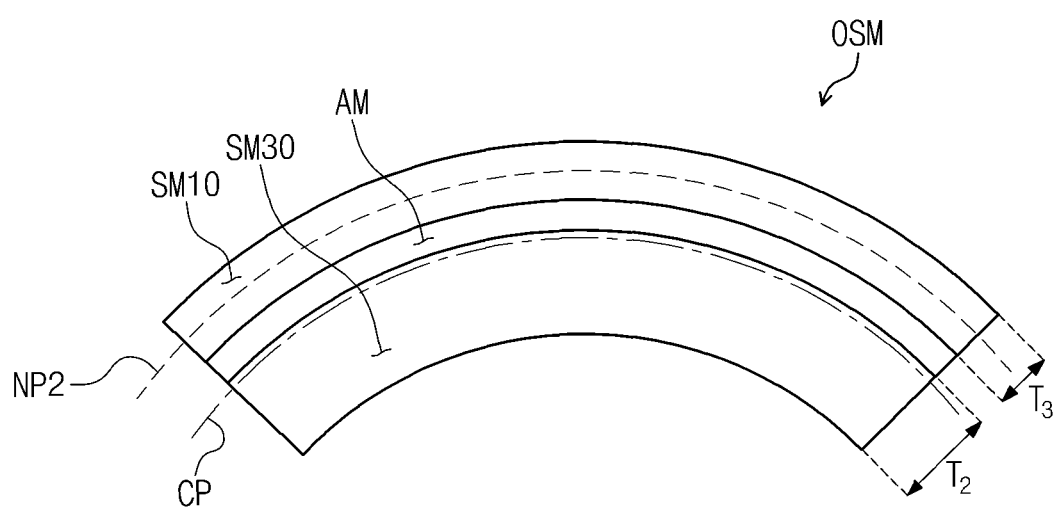

FIGS. 6A to 6C are cross-sectional views showing a position of a neutral plane of an outer member according to a thickness. A first member SM10, a second member SM20, and a third member SM30 of FIGS. 6A to 6C have Young's moduli different from each other. The Young's modulus of the first member SM10 is greater than the Young's modulus of the second member SM20. In addition, the Young's modulus of the first member SM10 is greater than the Young's modulus of the third member SM30.

In each of outer members OSM of FIGS. 6A to 6C, an adhesive layer AM is disposed between a plurality of members such that the adhesive layer AM couples two members adjacent thereto to each other. The adhesive layer AM also couples stresses of the two members to each other. Thicknesses of the outer members OSM of FIGS. 6A to 6C are equal to the thicknesses of the outer members OSM of FIGS. 5A to 5C.

FIG. 6A shows an outer member OSM of a comparison example. In the outer member OSM shown in FIG. 6A, the first members SM10 are sequentially stacked with the adhesive layer AM therebetween with respect to a bending direction. Here, a thickness $T_2$ of the first member SM10 far away from a bending axis is greater than a thickness $T_3$ of the first member SM10 near to the bending axis.

The outer member OSM of the comparison example shown in FIG. 6A may be modeled, as described above, as a single member having a thickness substantially equal to a sum of the thicknesses $T_2$ and $T_3$ of the first members SM10. Referring to the equations 3 and 4, the neutral plane NP2 of the comparison example may be substantially the same as a central plane CP of the outer member OSM of the comparison example.

FIG. 6B shows an embodiment of the outer member OSM including the first member SM10 and the second member SM20. In the embodiment of FIG. 6B, the second member SM20 is disposed between the bending axis and the first member SM10. The embodiment of FIG. 6B is substantially the same as the comparison example of FIG. 6A, except that the first member SM10 near to the bending axis is replaced with the second member SM20. If the Young's modulus condition is changed as shown in FIG. 6B, a position of the neutral plane NP2 is shifted.

As shown in FIG. 6B, the neutral plane NP2 is defined in the first member SM10 when the Young's modulus condition is changed to move the neutral plane NP2 into the member having the great Young's modulus under the same thickness condition as the comparison example shown in FIG. 6A. Referring to the equations 3 and 4, the neutral plane NP2 is defined between the central plane CP and an inner surface of the outer member OSM (e.g., a surface of the first member SM10).

Thus, in an exemplary embodiment of the outer member OSM shown in FIG. 4, if the thickness of the touch panel TP is greater than the thickness of the flexible member FM, the position of the neutral plane NP2 may be shifted into the touch panel TP having the Young's modulus greater than the Young's modulus of the flexible member FM.

In one exemplary embodiment, for example, a display device may include the touch panel TP having a thickness of about 75 μm and the flexible member FM having a thickness of about 50 μm and may be bent with the radius of curvature of about 5 mm. Positions of the neutral plane according to a Young's modulus ratio of the touch panel TP to the flexible member FM in such an embodiment are shown in the following Table 2.

TABLE 2

| Young's modulus ratio (n times) of touch panel to flexible member | Shifted distance of Neutral plane (μm) |
|---|---|
| 0.75 | 8.09 |
| 1 | 12.5 |
| 1.25 | 15.7 |

As shown in Table 2, if the thickness of the touch panel TP is greater than the thickness of the flexible member FM, the neutral plane NP2 may be shifted from the surface of the touch panel TP to the central plane of the touch panel TP even though the Young's modulus of the touch panel TP is substantially equal to the Young's modulus of the flexible member FM.

In an exemplary embodiment, as shown in Table 2, if the thickness of the touch panel TP is greater than the thickness of the flexible member FM, the neutral plane NP2 may be shifted into the touch panel TP even though the Young's modulus of the touch panel TP is smaller than the Young's modulus of the flexible member FM. In such an embodiment, where the thickness of the touch panel TP is greater than the thickness of the flexible member FM, the Young's modulus of the flexible member FM may be set to be greater than a Young's modulus of the flexible member FM that defines the neutral plane NP2 on a surface, which is adjacent to the flexible member FM, of the touch panel TP.

In an exemplary embodiment, as shown in FIG. 6C, a thick member may be disposed between a thin member and the bending axis. In such an embodiment, a thickness $T_3$ of the first member SM10 far away from the bending axis is smaller than a thickness $T_2$ of the third member SM30 near to the bending axis.

In FIG. 6C, the neutral plane NP2 is defined in the first member SM10. Referring to the equations 3 and 4, the neutral plane NP2 is disposed between the central plane CP and the inner surface of the outer member OSM (i.e., one surface of the first member SM10).

Thus, in an exemplary embodiment of the outer member OSM according to the invention, if the thickness of the touch panel TP is smaller than the thickness of the flexible member FM as shown in FIG. 4, the position of the neutral plane NP2 may be shifted to the touch panel TP of which the Young's modulus is greater than the Young's modulus of the flexible member FM.

In such an embodiment, a ratio of the Young's modulus of the first member SM10 to the Young's modulus of the third member SM30 may be greater than a ratio of the Young's modulus of the first member SM10 to the Young's modulus of the second member SM 20 shown in FIGS. 6A and 6B, by controlling the thicknesses of the first and third members SM10 and SM20.

In one exemplary embodiment, for example, a display device including the touch panel TP having a thickness of about 50 μm and the flexible member FM having a thickness of about 75 μm is bent with the radius of curvature of about 5 mm. In this case, positions of the neutral plane according to a Young's modulus ratio of the touch panel TP to the flexible member FM are shown in the following Table 3.

TABLE 3

| Young's modulus ratio (n times) of touch panel to flexible member | Shifted distance of Neutral plane (μm) |
|---|---|
| 4 | 7.95 |
| 5 | 10.6 |
| 6 | 12.5 |
| 8 | 15.1 |

As shown in Table 3, if the thickness of the touch panel TP is smaller than the thickness of the flexible member FM, the touch panel TP may have the Young's modulus greater than the Young's modulus of the flexible member to shift the neutral plane NP2 from the surface of the touch panel TP to the central plane of the touch panel TP.

Referring to Table 3, even though the thickness of the touch panel TP is smaller than the thickness of the flexible member FM, the neutral plane NP2 may be shifted into the touch panel TP when the Young's modulus of the touch panel TP is greater than the Young's modulus of the flexible member FM. Accordingly, in an exemplary embodiment of the display device according to the invention, the Young's modulus ratio of the touch panel TP to the flexible member FM may be effectively controlled to reduce or prevent damage of the electrode layer caused when the thin touch panel TP is bent.

According to exemplary embodiments of the invention, the position of the neutral plane may be controlled in the stack structure, which may be modeled as a single layer. The position of the neutral plane NP2 of the outer member OSM of an exemplary embodiment of a display device according to the invention may be controlled by varying at least one of the thicknesses and the Young's moduli of the members constituting the outer member OSM.

Figure 7:
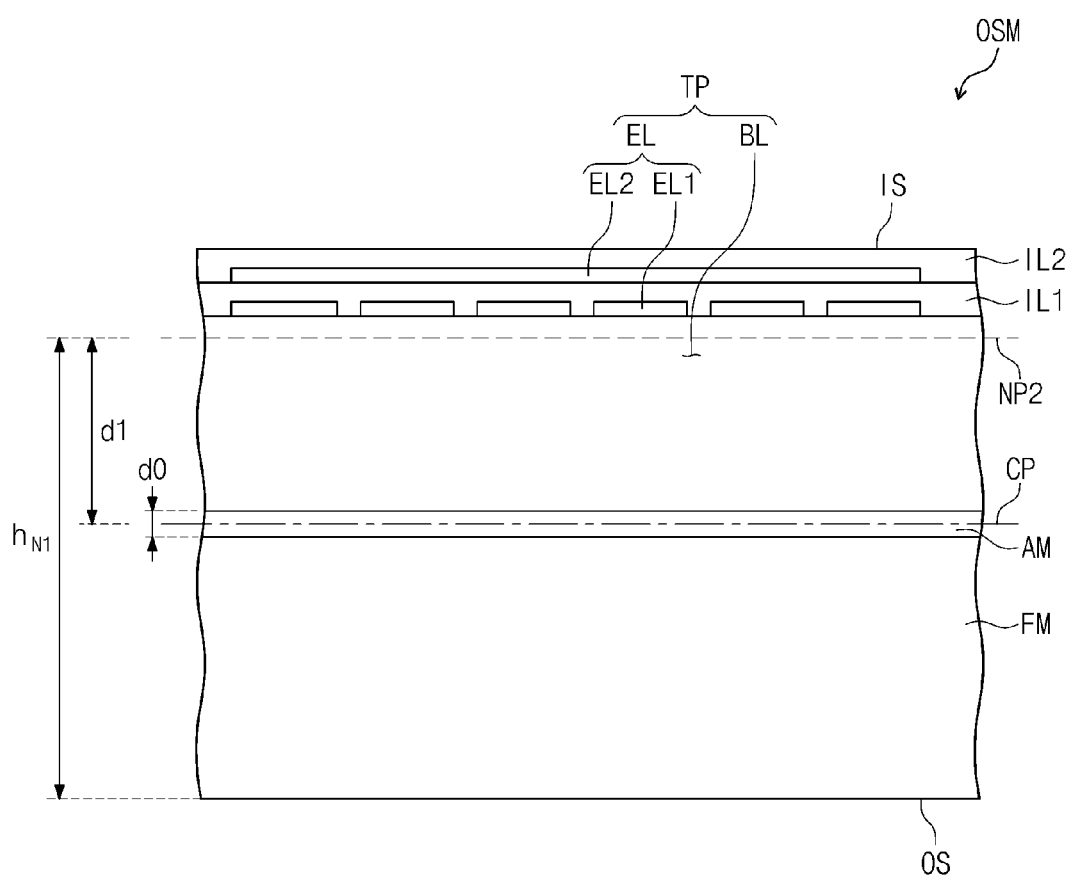
FIG. 7 is a cross-sectional view showing an exemplary embodiment of an outer member, according to the invention.

FIG. 7 is a cross-sectional view showing an exemplary embodiment of an outer member according to the invention. FIG. 7 shows an exemplary embodiment of an outer member including a capacitive type touch panel. FIG. 7 corresponds to an enlarged view of a portion of FIG. 4.

In an exemplary embodiment, as shown in FIG. 7, the touch panel TP includes a base layer BL and an electrode layer EL disposed on a surface of the base layer BL. In an exemplary embodiment, the electrode layer EL may include a first electrode layer EL1 and a second electrode layer EL2, which are disposed on the base layer BL. The base layer BL may be a plastic film, for example. In an alternative exemplary embodiment, the base layer BL may be omitted.

The capacitive type touch panel TP may include the first electrode layer EL1, a first inner layer IL1, the second electrode layer EL2 and a second inner layer IL2, which are sequentially stacked on the base layer BL. The first and second inner layers IL1 and IL2 may include an insulating material. In an alternative exemplary embodiment, the first electrode layer EL1 and the second electrode layer EL2 may be disposed on a same layer.

Each of the first electrode layer EL1 and the second electrode layer EL2 may include conductive patterns. The first electrode layer EL1 includes conductive patterns that are arranged in the first direction DR1 and extend substantially in the second direction DR2. The second electrode layer EL2 includes conductive patterns that extend substantially in the first direction DR1 and are arranged in the second direction DR2. FIG. 7 illustrates six conductive patterns included in the first electrode layer EL1 and one conductive pattern included in the second electrode layer EL2.

The capacitive type touch panel TP calculates coordinate data of an input spot (e.g., a touch position) by detecting a capacitance variation, which occurs when a finger or an electronic pen of a user is located at the touch position on the flexible member FM or the second inner layer IL2. Shapes of the conductive patterns of the first electrode layer EL1 and the second electrode layer EL2 may be variously modified based on a type of the touch panel TP.

In an exemplary embodiment, as shown in FIG. 7, a central plane CP of the outer member OSM may be defined in the adhesive layer AM disposed between the flexible member FM and the touch panel TP.

The neutral plane NP2 of the outer member OSM is defined to be shifted from the inner surface IS of the outer member OSM to the touch panel TP. A distance $h_{N1}$ between the neutral plane NP2 and the outer surface OS of the outer member OSM may correspond to the distance $h_N$ in the equation 4. In such an embodiment, the neutral plane NP2 of the outer member OSM is spaced apart from the central plane CP by a predetermined distance d1.

The distance d1 is beyond an error range d0 of a neutral plane defined on the central plane CP. The distance d1 may be greater than about a half of the error range d0.

The neutral plane NP2 of the outer member OSM is defined to be adjacent to the first electrode layer EL1 and the second electrode EL2. When the outer member OSM is bent, stresses applied to the first and second electrode layers EL1 and EL2 are progressively reduced as the first and second electrode layers EL1 and EL2 become closer to the neutral plane NP2 of the outer member OSM.

Thus, in such an embodiment, a strain of the electrode layer EL may be reduced. In an exemplary embodiment, the neutral plane NP2 is controlled to be adjacent to the electrode layer EL in the touch panel TP, such that damage of the electrode layer EL caused when the display device DD is bent may be substantially reduced or effectively prevented. As a result, an exemplary embodiment of the display device DD according to the invention may be stably driven when the display device DD is bent.

Figure 8:
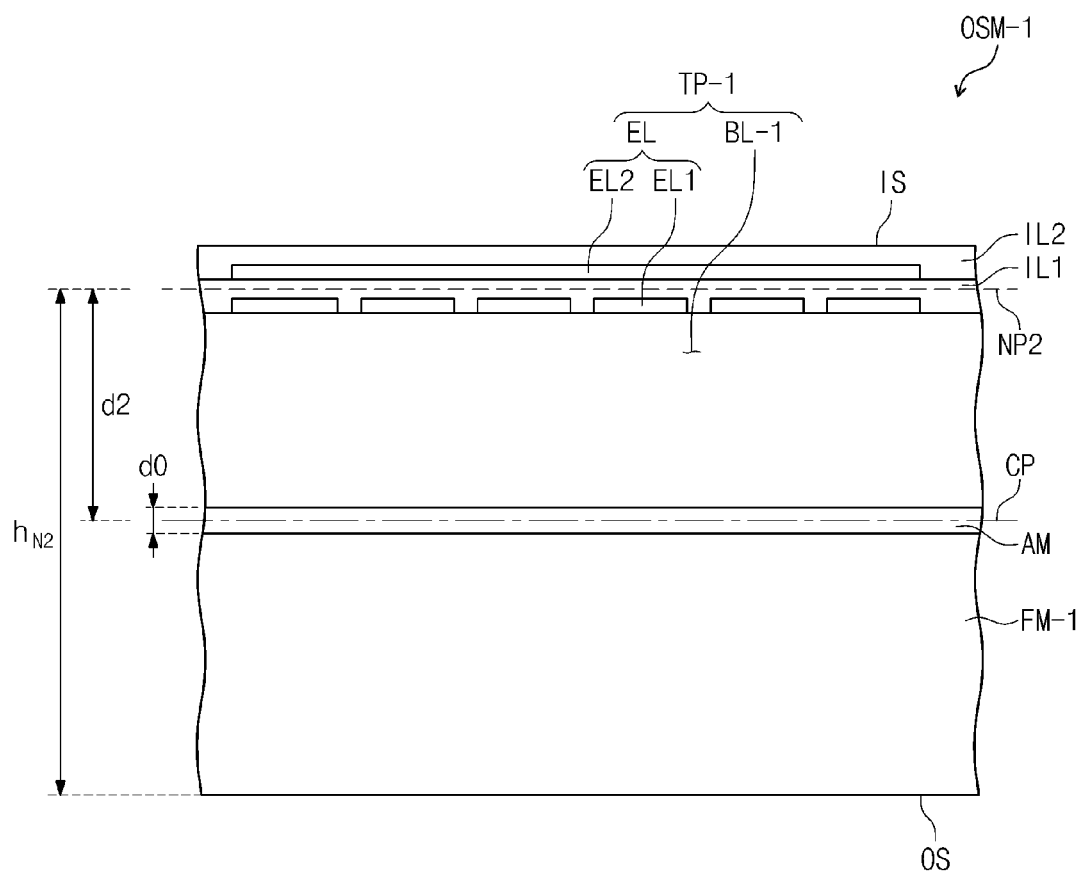
FIG. 8 is a cross-sectional view showing an alternative exemplary embodiment of an outer member, according to the invention.

FIG. 8 is a cross-sectional view showing an alternative exemplary embodiment of an outer member according to the invention. FIG. 8 shows an exemplary embodiment of an outer member OSM-1 having a neutral plane NP2 shifted from the position of the neutral plane NP2 of the outer member OSM of FIG. 7. The outer member in FIG. 8 is substantially the same as the outer member shown in FIG. 7 except a base layer BL-1 and neutral plane NP2 defined therein. The same or like elements shown in FIG. 8 have been labeled with the same reference characters as used above to describe exemplary embodiments of the outer member shown in FIG. 7, and any repetitive detailed description thereof will hereinafter be omitted or simplified.

A distance $h_{N2}$ between the neutral plane NP2 and the outer surface OS of the outer member OSM-1 may correspond to the distance $h_N$ shown in the equation 4. In such an embodiment, the neutral plane NP2 of the outer member OSM is spaced apart from the central plane CP by a predetermined distance d2. The distance d2 is beyond an error range d0 of the neutral plane defined on the central plane CP. The distance d2 may be greater than a half of the error range d0.

The distance $h_{N2}$ between the neutral plane NP2 and the outer surface OS of the outer member OSM-1 of FIG. 8 may be greater than the distance $h_{N1}$ between the neutral plane NP2 and the outer surface OS of the outer member OSM of FIG. 7. In an exemplary embodiment, as shown in FIG. 8, the neutral plane NP2 may be defined between the first electrode layer EL1 and the second electrode layer EL2.

In such an embodiment, a Young's modulus ratio of a touch panel TP-1 to a flexible member FM-1 of the outer member OSM-1 may be greater than that of the outer member OSM shown in FIG. 7 to further shift the position of the neutral plane NP2 toward the inner surface IS of the outer member OSM-1. For example, a Young's modulus ratio of the base layer BL-1 may greater than a Young's modulus ratio of the base layer BL of FIG. 7.

In an alternative exemplary embodiment, a ratio of a thickness of the touch panel TP-1 to a thickness of the flexible member FM-1 may be increased to shift the position of the neutral plane NP2. For example, a thickness of the base layer BL-1 may greater than a thickness of the base layer BL of FIG. 7. In an exemplary embodiment, with changing a property of the base layer of the touch panel TP, it is easy to control the position of the neutral plane NP2.

In an exemplary embodiment, the neutral plane NP2 is adjacent to the first and second electrode layers EL1 and EL2. In an exemplary embodiment, the neutral plane NP2 is defined between the first electrode layer EL1 and the second electrode layer EL2, such that stresses applied to the first and second electrode layers EL1 and EL2 may be reduced together.

In an exemplary embodiment of the display device DD according to the invention, the position of the neutral plane may be controlled to design a stable device layer (e.g., the electrode layer). Thus, the damage (e.g., a crack) of the electrode layer, which may be caused by bending of the display device, may be substantially reduced or effectively prevented, and the display device DD may be stably driven when the display device DD is bent.

While the invention is described herein with reference to exemplary embodiments, it will be apparent to those skilled in the art that various changes and modifications may be made without departing from the spirits and scopes of the invention. Therefore, it should be understood that the above embodiments are not limiting, but illustrative. Thus, the scopes of the invention are to be determined by the broadest permissible interpretation of the following claims and their equivalents, and shall not be restricted or limited by the foregoing description.

What is claimed is:

1. A flexible display device comprising:
a flexible display panel;
an outer member disposed on a surface of the flexible display panel and comprising an electrode layer; and
a stress control member disposed between the flexible display panel and the outer member, wherein the stress control member allows a first neutral plane to be defined in the flexible display panel and a second neutral plane to be defined in the outer member, when the flexible display device is bent,
wherein the outer member comprises:
a touch panel comprising the electrode layer;
a flexible member disposed on the touch panel; and
an adhesive layer disposed between the touch panel and the flexible member and which couples the touch panel to the flexible member, and wherein the second neutral plane is defined in the touch panel, and
wherein a position of the second neutral plane is controlled by a Young's modulus of the touch panel, a thickness of the touch panel, a Young's modulus of the flexible member, and a thickness of the flexible member.

2. The flexible display device of claim 1, wherein a maximum shear strain of the stress control member is about 150% or more.

3. The flexible display device of claim 2, wherein a maximum shear strain of the adhesive layer is less than about 150%.

4. The flexible display device of claim 3, wherein a maximum distance from the second neutral plane to the electrode layer in a thickness direction of the outer member is smaller than about a half of a thickness of the touch panel.

5. The flexible display device of claim 4, wherein
the touch panel further comprises a base layer on which the electrode layer is disposed,
the electrode layer comprises:
a first electrode layer disposed on the base layer and comprising a first conductive pattern extending substantially in a first direction; and
a second electrode layer disposed on the base layer and comprising a second conductive pattern extending substantially in a second direction,
wherein the second conductive pattern of the second electrode layer intersects and is insulated from the second conductive pattern of the second electrode layer.

6. The flexible display device of claim 5, wherein the touch panel further comprises an insulating layer disposed between the first and second electrode layers.

7. The flexible display device of claim 6, wherein the second neutral plane is defined between the first electrode layer and the second electrode layer.

8. The flexible display device of claim 4, wherein the second neutral plane is defined in the electrode layer.

9. The flexible display device of claim 1, wherein
the thickness of the touch panel is substantially equal to the thickness of the flexible member, and
the Young's modulus of the touch panel is greater than the Young's modulus of the flexible member.

10. The flexible display device of claim 9, wherein
the Young's modulus of the touch panel is n times the Young's modulus of the flexible member, wherein n is a positive real number,
the second neutral plane is spaced apart from a central plane of the outer member by a distance in a range of about n/20 to about n/10 of a thickness of the touch panel, and
the electrode layer is disposed between positions which are spaced apart from the central plane by about n/20 and about n/10 of the thickness of the touch panel, respectively.

11. The flexible display device of claim 1, wherein
the thickness of the touch panel is greater than the thickness of the flexible member, and
the Young's modulus of the touch panel is equal to or greater than the Young's modulus of the flexible member.

12. The flexible display device of claim 1,
wherein the position of the second neutral plane is substantially same as a distance between the second neutral plane and a central plane, and
wherein the central plane is defined to ½ of the thickness of the outer member.

13. The flexible display device of claim 1, wherein
the stress control member partially decouples a stress of the flexible display panel from a stress of the outer member so as to define the first neutral plane in the flexible display panel and to define the second neutral plane in the outer member different from the flexible display panel.

* * * * *